Figures 1, 2:
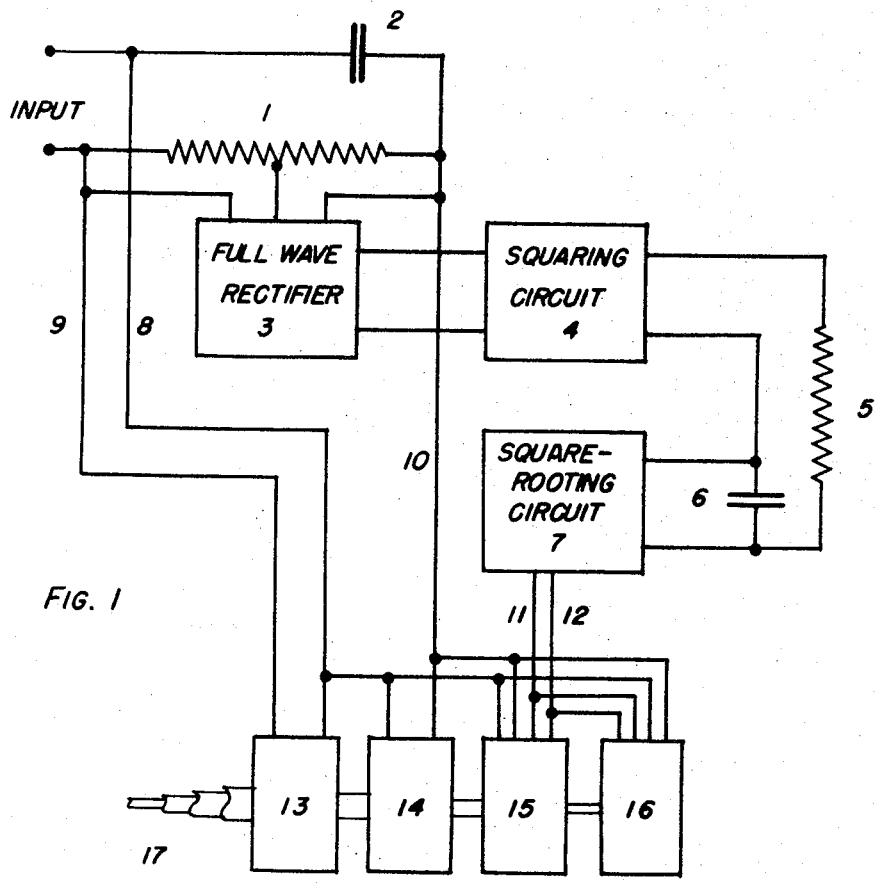

Jan. 27, 1959

W. F. HALL 2,871,447

ELECTRICAL MEASURING SYSTEM

Filed Aug. 13, 1956

INVENTOR
W. Ferguson Hall

United States Patent Office 2,871,447
Patented Jan. 27, 1959

2,871,447

ELECTRICAL MEASURING SYSTEM

William Ferguson Hall, Arlington, Va.

Application August 13, 1956, Serial No. 603,668

8 Claims. (Cl. 324—114)

This invention relates to electrical measurement, and in particular to an instrument system for measuring a number of statistical properties of a varying electrical quantity.

Measurement of an electrical quantity which varies with time is a commonplace occurrence. In such measurements the instruments employed are usually designed to indicate the current "instantaneous" value of the quantity, although many instruments, due to their design, tend to "lag" behind the actual value and thus to perform a degree of "smoothing" on the data.

Although the current instantaneous value is often of the greatest interest, in some applications it is also desirable to have at hand indications of certain other properties of the quantity being measured. Among these are the average value of the quantity over some period of time just preceding the present; another might be an indication of the variability of the quantity over the same period; and another might be the variability of the average values taken over successive periods.

The advantage of presenting both the instantaneous value and a time-lagged or smoothed value of an electrical current has been recognized by B. H. Smith, who describes such a system in his U. S. Patent No. 2,323,733, issued July 6, 1943. In his invention two electric meter movements and associated scales are enclosed in the same structure. One of the meters is responsive to the "instantaneous" value of the current being measured, while the other (a hot-wire device actuated by the heat developed in the first meter movement) is responsive to the values occurring over a period of time preceding the current observation, and thus gives a type of average value.

As is obvious, the true average or "mean" value of a series of observations or of a quantity which is varying with time would be obtained by adding up all the values occurring within a selected time period and dividing by the number of observations or by the time. In order to keep current track of the mean value one would repeat this calculation at frequent intervals, dropping off the older values and adding in the more recent ones. The result of such a process is the creation of a new time variable which is called a "running mean" or "moving average," and the longer the interval over which each average is computed, the more "stable" the resulting variations will be, and the smaller will be the effects of rapid and erratic fluctuations in the instantaneous values.

The true running mean is somewhat difficult to compute by analog methods, however, and as a substitute, a smoothed value obtained by passing a voltage representing the time series or time variable through a low-pass filter comprising a resistance and capacitance (R–C filter) is often employed. Such a filter does give a running mean, but it is a weighted running mean, with the most recent values having the greatest weight and successively earlier values having lesser weights. For many, if not most, practical purposes, the relative ease with which the R–C weighted mean can be obtained by a simple electrical circuit outweighs any disadvantages that such values might have as compared with the unweighted mean or with differently weighted means.

The variability of a series of observations or of a continuous quantity such as an electrical current is often measured in terms of the root-mean-square deviation of the quantity about its mean value over a given period. In normal computation the deviations are taken about the unweighted mean value over the period in question, are squared, and the mean of the squares obtained. The square-root of the resulting mean value then gives the root-mean-square value or the standard deviation. With a running time series, such as contemplated here, however, one substitutes the R–C weighted running mean for the true mean value, and measures the deviations from this weighted mean value. The deviations are then squared, and again an R–C filter is employed to provide a weighted running mean of the squared deviations. The square-root of this running mean is then obtained by analog means, and provides a running value of what might be termed the "weighted running standard deviation." Although the values thus obtained will in general differ from those which would have been obtained by conventional computations from a segment of the record of the measured variable, the difference in general will not be great and will be unimportant as compared with the ease of the analog computations.

In addition to the aforementioned statistical quantities one is often interested in how the running mean varies with time. In order to provide an indication of this variation, another weighted running mean is computed, this mean covering a much longer range of values of the variable than was the case before, so that the previous means will appear as variations from the long-term mean. Again this mean is obtained through the use of an appropriately long time-constant R–C filter. The earlier mean values are now treated as were the original variations around the mean—the deviations are squared, a weighted running mean is obtained, and the square-root is taken. This gives a weighted running standard deviation of the earlier mean.

The object of my invention is then to provide a means for deriving these various statistical functions from the original signal, and to provide a metering system which is adapted to simultaneous and continuous portrayal of such functions.

In accordance with the invention, an electrical system comprising elements commonly termed analog computing circuits is provided to derive the desired statistical functions from the input signal, and to provide output voltages which represent these functions. Also provided is a meter system which is actuated by these voltages for presenting a continuous indication of their values. In its preferred form the meter assembly comprises four separate meter movements with shafts disposed coaxially, and with four pointers or other indicators all operating over the same scale. One movement and associated pointer responds directly to the original varying electrical quantity, and the second responds to the computed weighted running mean. These meter movements are of the type commonly employed in direct-current voltmeters. The third and fourth movements are responsive to the sum and difference respectively of the weighted running mean and the standard deviation. The meter movements in this case differ from those in common use in that two actuating windings are provided in each movement. The windings are preferably equal in effect, and each has its separate terminals. In application to the system, one winding of each movement is connected to the output of the running mean circuit, and the other winding in each movement is connected to the output of the running standard deviation circuit, one in the same sense as the running mean and the other in the opposite sense; thus providing the sum and difference of the two signals in terms of the deflection of the two movements and their associated pointers.

Other objects of my invention, and the nature of the measuring system provided, will be apparent from the following description, taken in conjunction with the accompanying drawings.

Figure 1 of the drawings shows the circuit elements used in deriving the desired statistical quantities, as well as a generalized and exploded view of the meter movements used to display these quantities. Figure 2 shows a face view of a typical meter system to be used with the elements of Figure 1.

In Figure 1 the circuitry for deriving the desired functions comprises elements indicated by numbers 1 through 7. Connectors to the meter system bear numbers 8 through 12, and the meter movements comprise elements 13 through 16, with coaxial shaft 17. The variable voltage to be measured is applied through the input to the R–C filter comprising resistor 1 and capacitor 2. The values of these elements are adjusted to provide the desired time constant, which will normally be equal to a period covering a large number of the characteristic variations in the input voltage. The output of this filter (connectors 8 and 10, across capacitor 2) consists of the desired weighted running mean of the input voltage. Instantaneous deviations from the running mean appear across resistor 1. This resistor is center-tapped, and the voltage across it is applied to the full-wave rectifier 3, which rectifies the deviations in both directions about the mean. The signal is then squared in squaring circuit 4, and a running mean obtained by the R–C filter comprising resistor 5 and capacitor 6. The square-root of the resulting voltage is taken in the square-rooting circuit 7, and the output of this circuit represents the desired value of the running standard deviation. Details of the squaring and square-rooting elements are not shown, since such analog computing elements are well-known, and are described, for example, in Electronic Instruments, by Greenwood, Holdam and Macrae, vol. 21, M. I. T. Radiation Laboratory Series, McGraw-Hill, New York, 1948, pp. 120 ff., 138. Depending upon the strength of the input signal it may be desirable to amplify the signal in order that sufficient power will be available to operate the meter movements. Amplifiers suitable for this purpose (not shown) can be of conventional type appropriate to the signal structure in the circuit and can be inserted where needed.

It is important to note that the two types of output signals, namely the weighted running mean and the weighted running standard deviation, are dimensionally homogeneous—that is, both have the same dimensions as the input intelligence and are thus compatible for linear combination in the metering system.

The movements of the meter system are numbered 13 through 16 in Figure 1, and are so disposed that the shafts of each are coaxially mounted, each shaft being free to turn independently of the others. Referring both to Figures 1 and 2, movement 13 controls pointer 20 of meter assembly 23, movement 14 controls pointer 19, movement 15 controls pointer 21, and movement 16 controls pointer 22. Movements 13 and 14 are of the type commonly used in direct-current measurements in which a linear angular displacement of the pointer is produced by the interaction between a permanent magnet and a magnetic field induced by the input current in a winding. Movements 15 and 16 are of the same general type except that dual windings are employed in each movement. The two windings in each case are preferably designed to exert an equal effect on the angular displacement of the pointer.

The instantaneous input voltage is applied directly to meter movement 13 through connectors 8 and 9, and represents the conventional practice in directly measuring a varying voltage. The weighted running mean signal is applied to movement 14 through connectors 8 and 10. This same signal is also applied to one winding each of movements 15 and 16. The running standard deviation signal is applied to the other windings of movements 15 and 16 in the opposite sense—in the case of movement 15 to oppose the running mean signal, and in the case of movement 16 to reinforce it.

Again referring to both figures, movement 13 thus provides a visual indication of the original signal in a conventional manner by means of pointer 20 on scale 18. Movement 14 similarly provides an indication of the current value of the running mean through pointer 19. Movements 15 and 16 are controlled both by the value of the running mean and the value of the standard deviation. If there is no standard deviation signal, pointers 21 and 22 are together, and both register the running mean. In the presence of a standard deviation signal, however, they diverge in accordance with the strength of the signal, since this signal opposes the running mean signal in movement 15 and reinforces it in movement 16. Pointers 21 and 22 thus remain at an equal angular distance from the running mean pointer 19 at all times, and continuously indicate the spread of the weighted running standard deviation about the running mean. If desired, vanes can be substituted for these pointers in such a way that as the movements diverge a wedge-shaped area on the scale is revealed in accordance with the value of the standard deviation.

The signal levels of the original signal and of the generated functions are adjusted, taking into account the sensitivity of the respective meter movements, so that the angular displacements of the pointers are consistent.

In some applications the value of twice the standard deviation may be desired, and this will be allowed for when scale-factor adjustments are made.

As mentioned earlier, in some applications it may be desired to obtain and portray the standard deviation of the running mean, in addition to the quantities portrayed by means of the system already described. This can be accomplished by employing another complete system just as described above. In this case, however, the input signal applied is the initial weighted running mean signal, namely the signal across connectors 8 and 10 of the original system. Since a visual indication of this signal will have already been provided (pointer 19 of the original system), it will usually not be necessary to repeat this presentation on the second system, and consequently the equivalents of movement 13 and pointer 20 can be omitted from the second system.

Recognizing that a number of modifications of my invention are possible without departing from the basic principles illustrated, I have attempted to present a specific embodiment which is satisfactory in operation and convenient of design and construction. One variation in the system might be mentioned, however. In some cases the average value of the deviations about the running mean rather than the standard deviation may be adequate for a given application. The squaring circuit 4 and the square-rooting circuit 7 can then be eliminated, the input and output wires being connected together to by-pass these elements. The output of rectifier 3 would then feed directly to the filter comprising elements 5 and 6, and the output of this filter (across capacitor 6) would feed directly into connectors 11 and 12.

I claim:

1. In an electrical measuring system, means for generating a weighted running mean value of an input signal, means for generating a running value of the mean variations of the input signal about said running mean, and means for combining the two generated values whereby the mean variation of the input signal is displayed in relation to the weighted running mean value.

2. A system for measuring statistical properties of a time-varying electrical input signal, comprising a filter yielding separately a weighted running mean value of the input signal and the time variations of the input signal about such mean value, means for producing from such time variations a value of the running standard deviation of the input signal, and means for displaying said running standard deviation value against said weighted running mean value.

3. A system for measuring statistical properties of a time-varying electrical input signal, comprising a filter yielding separately a weighted running mean value of the input signal and the time variations of the input signal about such mean value, means for producing from such time variations a value of the running standard deviation of the input signal, and means for displaying both the input signal and said running standard deviation value against said weighted running mean value.

4. A system as described in claim 2, in which the means for producing the running standard deviation value include a rectifier for the time variations of the input signal about the weighted running mean value of the input signal, means for squaring the rectified variations, a filter for producing a weighted running mean value of the squared variations, and means for producing the running square-root of the output of such filter.

5. A system as described in claim 2, in which said display means consist of an electrical metering system comprising a plurality of coaxially mounted movements, in which at least one movement is actuated by the weighted running mean value of the input signal, and at least one other movement is actuated jointly by the values of said running mean and said running standard deviation.

6. A system as described in claim 3, in which said display means consist of an electrical metering system comprising a plurality of coaxially mounted movements, in which at least one movement is actuated by the weighted running mean value of the input signal, at least one movement is actuated by the input signal itself, and at least one other movement is actuated jointly by the values of said running mean and said running standard deviation.

7. A system as described in claim 2, in which the means for producing the running standard deviation value include a rectifier for the time variations of the input signal about the weighted running mean value of the input signal, means for squaring the rectified variations, a filter for producing a weighted running mean value of the squared variations, and means for producing the running square-root of the output of such filter, and in which said display means consist of an electrical metering system comprising a plurality of coaxially mounted movements, in which at least one movement is actuated by the weighted running mean value of the input signal, and at least one other movement is actuated by the combined values of said running mean and said running standard deviation.

8. A system as described in claim 2, in which the means for producing the running standard deviation value include a rectifier for the time variations of the input signal about the weighted running mean value of the input signal, means for squaring the rectified variations, a filter for producing a weighted running mean value of the squared variations, and means for producing the running square-root of the output of such filter, and in which said display means consist of an electrical metering system comprising a plurality of coaxially mounted movements, in which at least one movement is actuated by the weighted running mean value of the input signal, and two others are actuated by the sum and difference respectively of said running mean value and said running standard deviation value.

References Cited in the file of this patent

UNITED STATES PATENTS

| | | |
|---|---|---|
| 2,206,416 | Mathes | July 2, 1940 |
| 2,477,395 | Sunstein | July 26, 1949 |
| 2,517,216 | Lamb | Aug. 1, 1950 |
| 2,539,143 | Knudsen | Jan. 23, 1951 |
| 2,582,851 | Ruge | Jan. 15, 1952 |